(No Model.)

A. E. SEINECKE.
FLOAT WATER GAGE.

No. 495,523. Patented Apr. 18, 1893.

Attest.
Arthur Moore
Samuel M Quinn

Inventor.
Adolph E. Seinecke.
by James K. Layman.
Atty.

UNITED STATES PATENT OFFICE.

ADOLPH E. SEINECKE, OF CINCINNATI, OHIO.

FLOAT WATER-GAGE.

SPECIFICATION forming part of Letters Patent No. 495,523, dated April 18, 1893.

Application filed August 3, 1891. Serial No. 401,512. (No model.)

*To all whom it may concern:*

Be it known that I, ADOLPH E. SEINECKE, a citizen of the United States, residing at Cincinnati, in the county of Hamilton and State of Ohio, have invented certain new and useful Improvements in a Combined Cistern-Indicator and Leak-Detector; and I do hereby declare the following to be a full, clear, and exact description of the invention, reference being had to the annexed drawings, which form a part of this specification.

My invention comprises a specific construction of indicator to be attached either to a cistern-box or pump-frame, for the double purpose of showing the exact depth of water in a cistern or well and exposing any leakage or waste therefrom, the action of the indicator being wholly automatic after it has been properly adjusted, as hereinafter more fully described.

Figure 1:
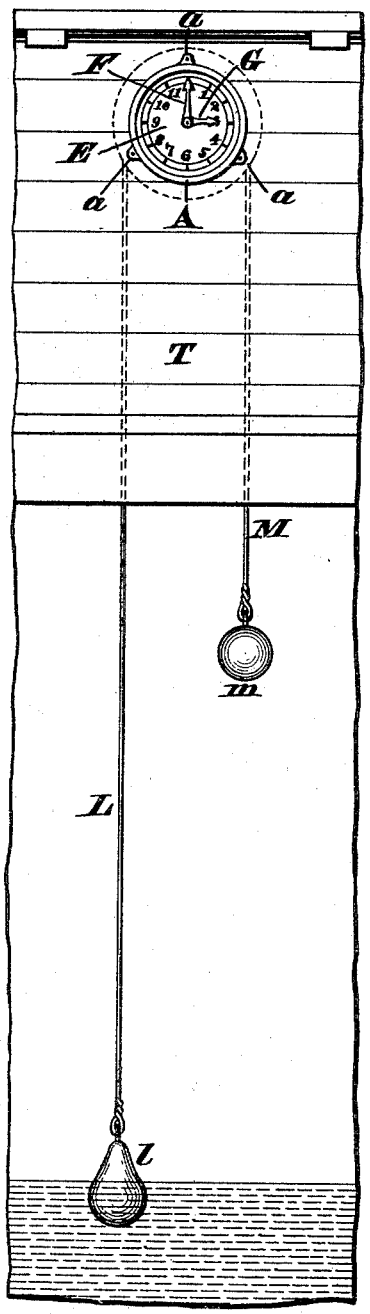
Figure 2:
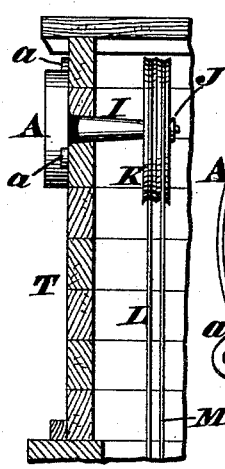
Figure 3:
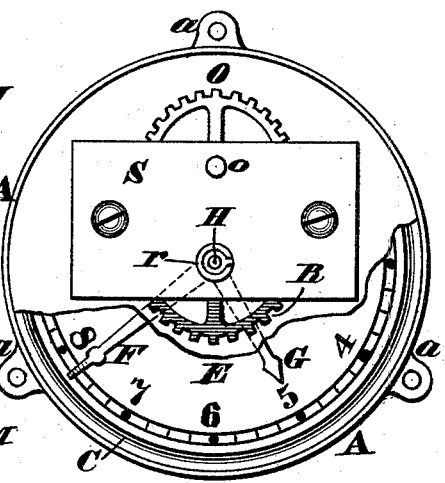
Figure 4:
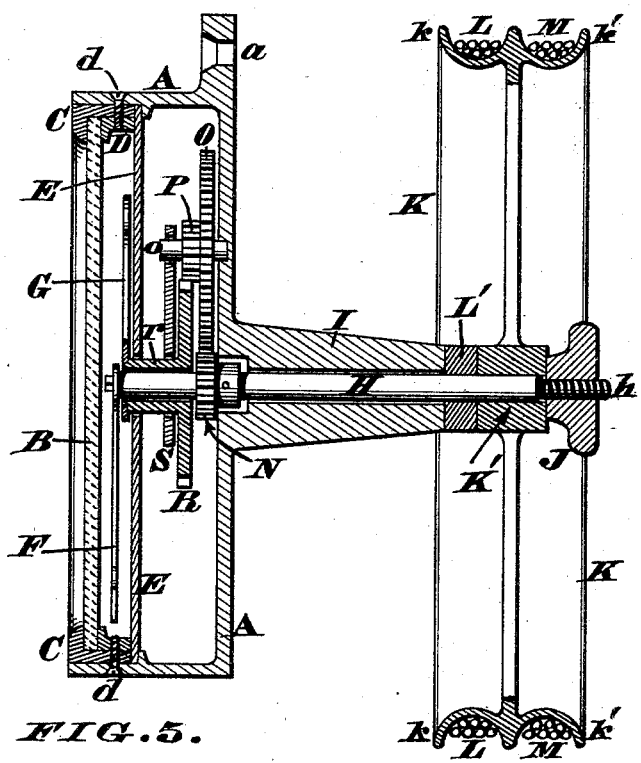
Figure 5:

In the annexed drawings, Figure 1 is a front elevation showing my combined cistern-indicator and leak-detector applied to a cistern-box, and the float of the device partially immersed in the water. Fig. 2 is a side elevation of that portion of the device contained within said box. Fig. 3 is an enlarged front elevation of the case or shell of the device, a portion of its dial being broken away to expose the gearing. Fig. 4 is an enlarged axial section of the indicator, which section is taken in the plane of main spindle. Fig. 5 is a detail view.

The principal member of my device is a shallow, cylindrical-case or shell A, closed at back, but open in front to admit a glass plate B, which latter is confined between a pair of rings C, D, held in place by screws $d$. Located behind this glass is a disk E numbered from 1 to 12 in practically the same manner as a clock dial, the only material difference being that in the present case there are four divisions between each number. These divisions indicate the four quarters of an inch. (See Fig. 3.) Adapted to turn around in front of this dial is a long hand F, that indicates inches and quarters thereof, and a short hand G, that designates feet, said long-hand F, being attached to a main spindle H, which is journaled in a tubular bearing I, projecting rearwardly from the case A, the rear end of said spindle being screw threaded at $h$, to permit the ready engagement of a thumb-nut J. This nut bears against one end of the hub K' of a wheel or sheave K, the opposite end of said hub being notched or corrugated, as seen at $k''$ in Fig. 5, to engage with similar indentations $l'$, in the end of a short collar L', the latter being forced tightly on the spindle H, so as to compel it to turn in unison with said collar. Furthermore, the sheave has a pair of circumferential grooves $k.\ k'$, within which are wound, reversely, wires L. M, the former of which carries a suitable float $l$, usually of glass, while the latter supports a weight $m$. Attached to spindle H is a pinion N, gearing with a wheel O, the shaft of which $o$, has a pinion P, which latter drives a wheel R having a sleeve $r$, turning on said spindle, and carrying the short hand G.

S is a plate that supports one end of the shaft $o$, and keeps the gears in their proper places.

$a.\ a.\ a.$ are perforated lugs projecting from the case A, and enabling its ready attachment to a box or frame or other fixture T at the top of a cistern or well.

In constructing this indicator, care must be taken to have the measuring sheave K exactly one foot in circumference, and the gears N, O, P, R, must be so arranged as to compel the long hand, F, to make one complete turn around the dial E, while the short hand G is traveling from one number to another on said dial, or in other words, while this short hand is making one twelfth of a revolution.

To apply and set the device, the wheel K is first temporarily detached from spindle H, and a hole being bored in the cistern box, or pump-frame T, the bearing I is then passed through this hole, and the case A is secured by screws or nails inserted in the perforated lugs $a.\ a.\ a$, as seen in Fig. 1. Measuring wheel or sheave K is now temporarily coupled to spindle H, and weight $m$ attached to wire M, and allowed to descend until said weight rests upon the cistern bottom. Glass float $l$ is next attached to the wire L and allowed to run down until said float rests upon the surface of the water, and as this float is somewhat heavier than the weight $m$, the latter is elevated accordingly. The exact depth of water in the cistern is then measured with a pole, and presuming it is found to be five feet, seven and three quarters of an inch, as seen in Fig. 3, the sheave K is again temporarily uncoupled from the collar L', and said sheave is held perfectly still while spindle H is being turned cautiously until the hands F, G, reach the positions seen in said illustration, which act sets the indicator properly. Sheave K is now permanently engaged with the collar L', and immovably secured in place by screwing the nut J very tightly, and then the device will automatically and unerringly indicate every change of water level. If water should run into the cistern, the float $l$ will be raised and the hands F, G, be turned around and show the exact increase, both in feet and inches and quarters of inches, while any waste or loss of water will cause the float to fall, thereby turning said hands in the opposite direction. From this description it is apparent that the water level can be known at any time by simply referring to the dial, and without raising the lid of the cistern box, or opening any of the pump attachments. It is also evident that by noting the position of the hands at night and then referring to them early in the morning before the cistern has been used, any leakage of water will be instantly detected. The case A is hermetically sealed to prevent the glass B sweating, and the sheave, gear wheels and pinions are made of any metal or metals that will not corrode, the sheave being provided with a pair of grooves to prevent interference of the two wires L and M.

I claim as my invention—

The combination, in a cistern indicator and leak detector, of the within described specific arrangement of devices, which arrangement comprises the case A, having a rearward tubular-bearing I, and inclosing a numbered dial E, having four divisions between each number, the spindle H journaled in said bearing, and carrying a long hand F and pinion N, the measuring wheel K attached directly to the inner end of said spindle and having a pair of circumferential grooves $k, k'$, the suspenders L, M, wound reversely within said grooves, and provided, respectively, with a float $l$ and weight $m$, the wheel O secured to a shaft $o$ and gearing with said pinion N, the pinion P, secured to said shaft $o$, the sleeve $r$, journaled on the spindle H, the short hand G fastened to the front end of this sleeve, and the wheel R applied to the rear end thereof and gearing with said pinion P, the proportions of these gears being such as to compel the long hand F to make one complete circuit around said dial E while the short hand G is traveling from one number to another number of the same, all as set forth.

In testimony whereof I affix my signature in presence of two witnesses.

ADOLPH E. SEINECKE.

Witnesses:
JAMES H. LAYMAN,
SAMUEL M. QUINN.